United States Patent [19]

Dvornak et al.

[11] Patent Number: 5,104,456
[45] Date of Patent: Apr. 14, 1992

[54] PROCESS FOR OPTIMIZING TITANIUM AND ZIRCONIUM ADDITIONS TO ALUMINUM WELDING CONSUMABLES

[75] Inventors: Matthew J. Dvornak; Robert H. Frost, both of Golden, Colo.

[73] Assignee: Colorado School of Mines, Golden, Colo.

[21] Appl. No.: 480,568

[22] Filed: Feb. 15, 1990

[51] Int. Cl.$^5$ .................. B22D 21/00; C22C 21/00
[52] U.S. Cl. ............................. 148/2; 29/527.5; 29/527.7; 148/11.5 A; 420/552
[58] Field of Search .......... 148/2, 11.5 A; 420/552; 29/527.5, 527.7

[56] References Cited

PUBLICATIONS

Matsuda et al., "Effect of Additional Element on Weld Solidification Crack Susceptibility of Al–Zn–Mg Alloy (Report I)", Trans. JWRI, vol. 12 (1983), No. 1, pp. 81–87.

Primary Examiner—R. Dean
Assistant Examiner—Robert R. Koehler
Attorney, Agent, or Firm—Richard W. Hanes

[57] ABSTRACT

A process for optimizing grain refining response of intermetallic $TiAl_3$ or $ZrAl_3$ in aluminum welding consumables comprising the steps of processing the intermetallic particles to first form a flake morphology in a master alloy solid, then as a component of the production of an ingot from an aluminum melt, to thermally fracture the flakes, then obtain dissolution of the interface material to increase distribution of the fractured particles and then, by mechanical working, to further fracture and distribute the intermetallic particles. The process is continued during the welding operation by using specific welding parameters during the welding with the consumable such that the intermetallic particles can withstand the weld pool environment in order that they maintain the characteristics and properties which will result in the creation of a small grain size in the weldment.

9 Claims, 7 Drawing Sheets

FIG. 1A  50 μm
FIG. 1B  50 μm

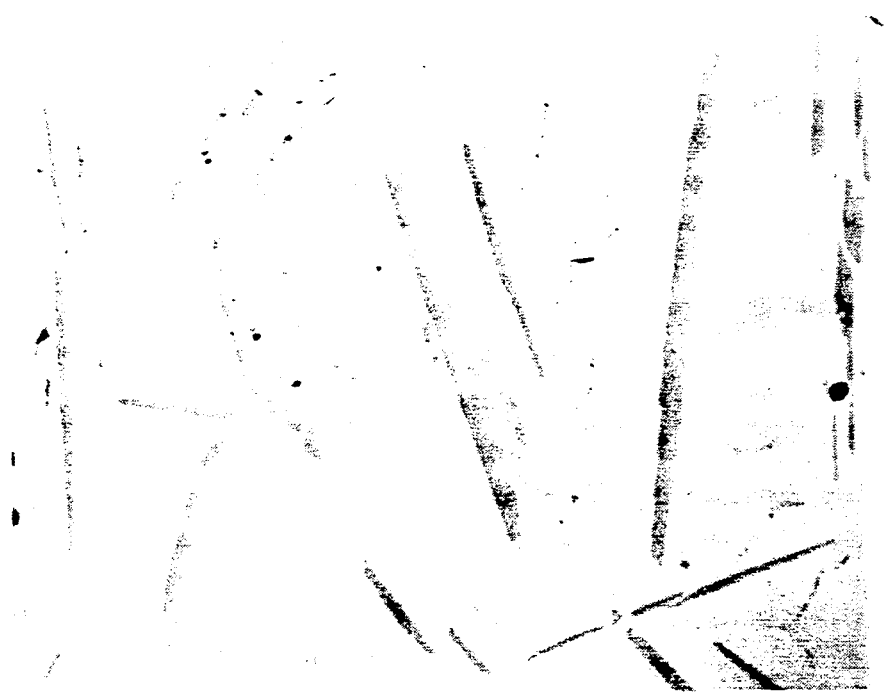
FIG. 2A  50 μm
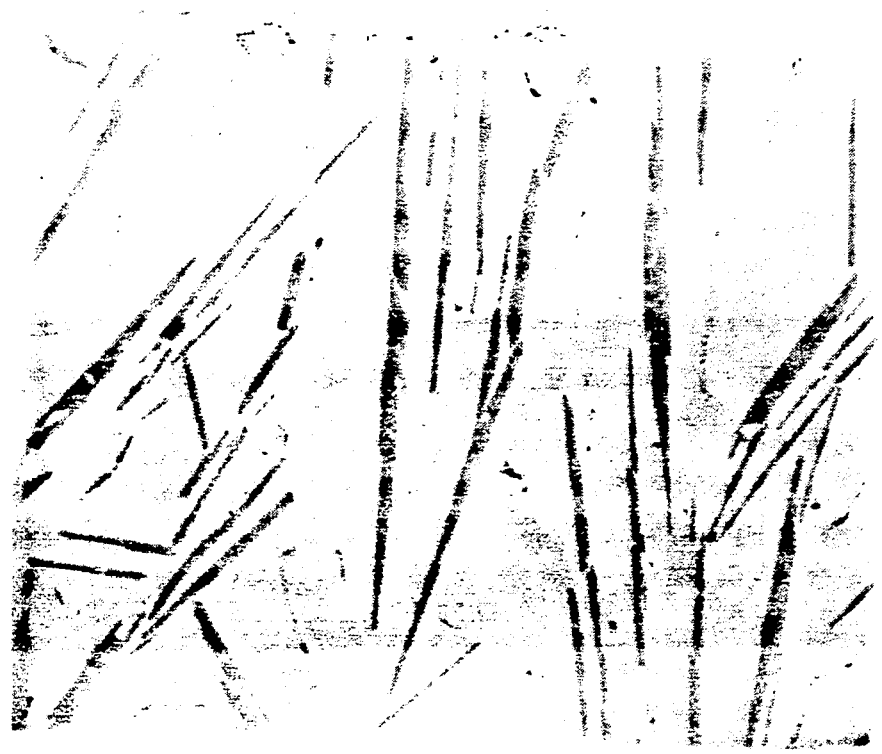
FIG. 2B  50 μm

FIG. 3A  50 μm
FIG. 3B  50 μm

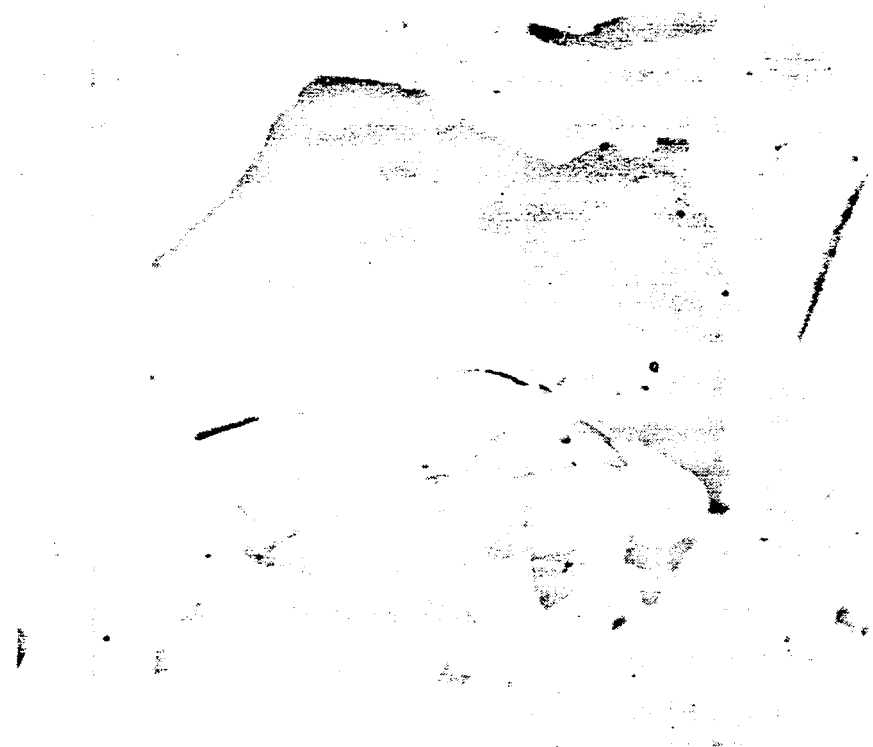
FIG. 4   20 μm

FIG. 5A  50 μm
FIG. 5B  20 μm

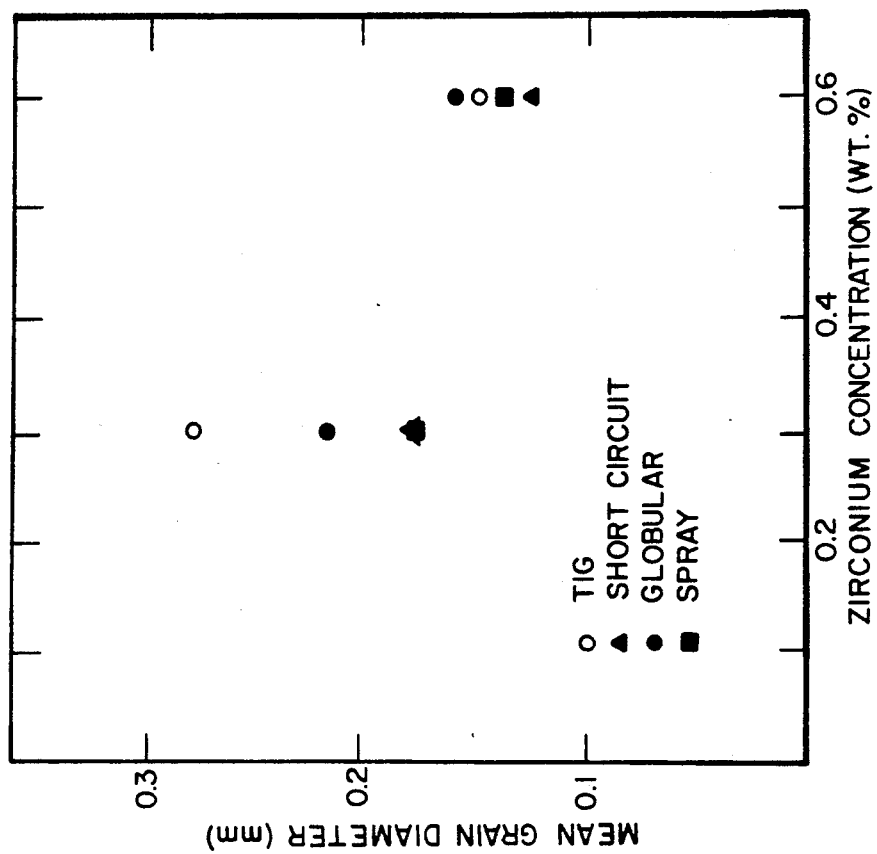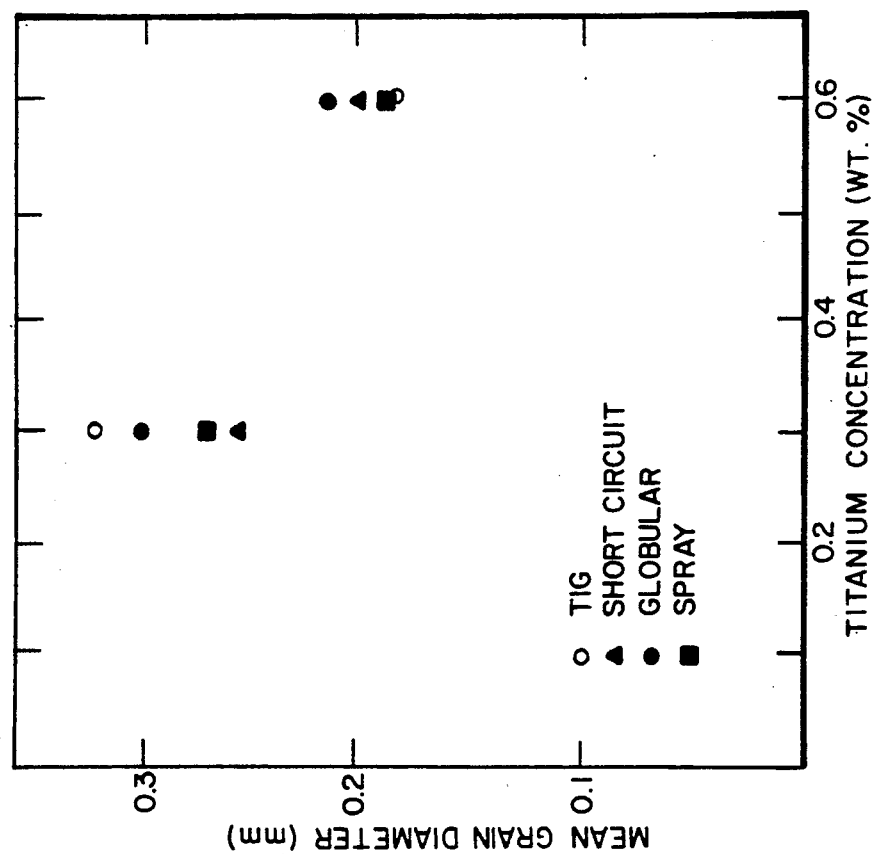

PROCESS FOR OPTIMIZING TITANIUM AND ZIRCONIUM ADDITIONS TO ALUMINUM WELDING CONSUMABLES

The present invention relates to a process for the production of aluminum welding consumables and more particularly to the control of the distribution of the intermetallic phase of $TiAl_3$ and $ZrAl_3$ in order that these compounds will possess the correct size distribution and morphology to optimize weld grain refinement and ultimate aluminum weldability.

BACKGROUND OF THE INVENTION

Weldability of aluminum alloys is often defined by their susceptibility to the formation of hot tears since this weld defect is the most prevalent one found and depends primarily upon composition of the alloy; whereas, other defects are more process-and-procedure-related. The hot tear defect manifests itself in the form of a crack generated behind the solidification front of a weld and therefore is deleterious in terms of weld metal mechanical integrity. Hot tears will form during the welding process if the alloy possesses an inherent susceptibility and sufficient strain exists in the weld to cause their formation. The major factors which contribute to the alloy's susceptibility to this defect are the coarseness of the solidification structure, the amount and species of the alloy elements and the geometry of the welded joint (restraint stresses). The crystallographic nature of solidification ordains that solidifying grains of weld metal will assume the orientation of their parent seed crystals which are adjacent to the fusion zone. Even though competitive growth between grains will exist owing to the relationship between preferred growth directions and the thermal gradients in the weld pool, the nucleation of new grains with more favorable orientations is seldom observed in the absence of heterogeneous nuclei. A low rate of nucleation of new weld metal grains allows the growth of large columnar grains, leading to segregation of elements at the centerline which may enhance hot tear formation in a localized region. Therefore one of the keys to controlling hot tearing susceptibility is to refine the weld metal structure.

In aluminum alloys certain alloying elements show a higher propensity to the hot tearing phenomena. The solutions employed in the past in the area of alloying have been to avoid the use of certain alloys with high susceptibilities, or to use filler wire alloy compositions which reduced the susceptibility as a result of dilution effects which change weld bead chemistry during welding.

Prior art improvements have been achieved in the weldability of aluminum alloys through refinement of the weld metal grain size by adding an element which will provide some type of substrate upon which new grains of weld metal can form. The two most common elements used in aluminum alloys to achieve this heterogeneous nucleation have been titanium and zirconium. These two elements produce refinement because an intermetallic compound is formed when they are combined with aluminum, existing in the stoichiometric ratio of 1:3 for titanium or zirconium to aluminum (i.e., $TiAl_3$ and $ZrAl_3$). Particles of this intermetallic compound provide a substrate upon which new grains of weld metal may form through a peritectic reaction mechanism, thereby causing a refinement in the weld metal structure.

THE PRIOR ART

The prior art concerning titanium and zirconium alloy additions to aluminum weldments has established their contribution to the enhancement of aluminum weldability through the heterogeneous nucleation of new grains resulting in refined weld metal grain size. In fact, the role of grain size and its effect on the mechanical properties and hot tearing susceptibility of aluminum welds is well documented.

Microadditions of titanium and zirconium have been the most popular solutions to achieving a refined grain structure for enhanced weldability. A paper by F. Matsuda. et al. entitled "Effect of Additional Element on Weld Solidification Crack Susceptibility of Al-Zn-Mg Alloy (Report II) reported in Transactions of JWRI, 12, p. 81-87 (1983) best summarizes the state of the art in understanding the relationship between weldability and grain size, as a function of the additions made to weldments of aluminum-based alloys. The results of the Matsuda et al. work indicated a decrease in the total crack length with increased concentration of the added elements. Combinations of the grain refiner elements have also been shown less effective than the use of a single refiner element.

While the prior art has recognized that additions of grain refiner elements, such as titanium and zirconium, do improve weldability by refining the grain size of the weldment, there has been a noticeable absence in the prior art of technical approaches to the actual manufacture of the welding consumables containing these additives or the associated parameters for the formation of the weld itself.

The conclusions of the prior art are vacuous on the issue of whether or not the intermetallic inclusions must be present prior to the actual weld fabrication or whether they somehow form during the welding process prior to their being available as heterogeneous nucleation sites for the formation of aluminum grains.

The prior art is anything but conclusive as to the relationship between usable intermetallic inclusions in the welding consumable, such as the welding wire, and the process of manufacturing the consumable. Similarly, the prior art is silent on the sensitivity of the intermetallic inclusions in the consumable to the thermodynamics of the weld itself.

OBJECT OF THE INVENTION

Having determined, as a part of this invention, that the intermetallic form of the titanium or zirconium addition ($TiAl_3$ or $ZrAl_3$) must be contained in the weld metal prior to the welding process and having further determined that the sensitivity of the intermetallic particles to weld metal thermodynamics (specifically the cooling rate) mandates care that these particles survive until solidification proceeds in order for heterogeneous nucleation to occur, it is the primary object of the present invention to provide a process for the manufacture of a welding consumable which will maximize the known propensity of titanium and zirconium to enhance the weldability of aluminum, taking into consideration the discovered fact that the form and distribution of the intermetallic particles which provide the nucleation sites are highly sensitive to the thermomechanical processing variables associated with the formation of the consumable.

A second object of the invention is to provide a definition of the optimal concentration levels of titanium or zirconium in aluminum weldments, consistent with good weldability and appropriate weld metal mechanical properties.

Another object of the invention is to recommend the type of welding parameters to be used during the formation of weldments utilizing the welding consumable manufactured in the abovementioned process. These recommendations are specific such that the intermetallic particles can withstand the weld pool environment in order that they maintain the characteristics and properties which will result in the creation of a small grain size in the weldment.

DESCRIPTION OF THE DRAWINGS

FIG. 1 is a photomicrograph of the aluminum-6% titanium master alloy ingot showing the $TiAl_3$ intermetallic crystals which exist in the flake morphology.

FIG. 2 is a photomicrograph of the aluminum-6% zirconium master alloy ingot showing the $ZrAl_3$ intermetallic crystals which exist in the flake morphology.

FIG. 3 is photomicrographs of the recast ingots from which the welding consumables were manufactured showing the fractured and separated crystals. The arrows point to areas of just-fissured sections and fissured sections which have begun to separate from the original crystal.

FIG. 4 is a photomicrograph showing the $TiAl_3$ flake crystal which is partially fractured from which smaller sections of the original crystal have begun to separate (500 X magnification).

FIG. 5 is photomicrographs taken of the aluminum-titanium recast ingot rolled down to a 5.33 mm diameter prior to the wire drawing operation for the production of a MIG welding consumable. The intermetallic phase is shown to be further divided and smaller in size than the crystals prior to mechanical deformation.

FIG. 6 is a plot of the mean grain diameter taken at the center of the weld longitudinal cross-section versus concentration of titanium for comparison of the three transfer modes associated with the MIG welding process and the TIG welds performed at the same concentration levels.

FIG. 7 is a plot of the mean grain diameter taken at the center of the weld longitudinal cross-section versus concentration of zirconium for comparison of the three transfer modes associated with the MIG welding process and the TIG welds performed at the same concentration levels.

DETAILED DESCRIPTION OF THE INVENTION

Figure 9:
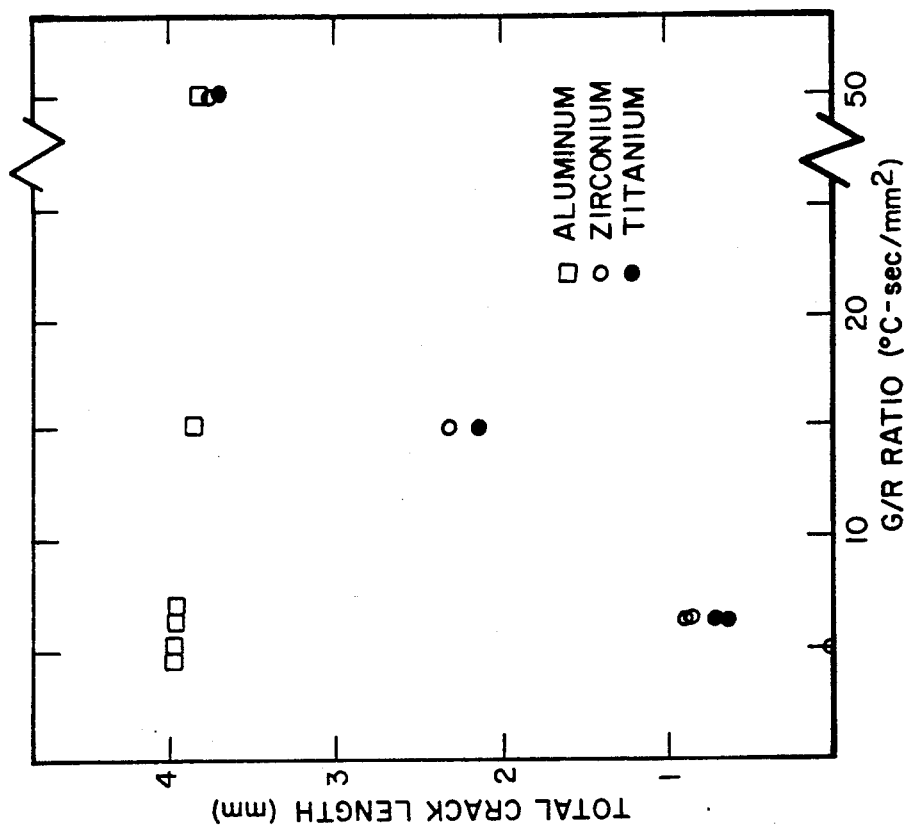
FIG. 9 is varestraint test data showing a plot of total crack length versus thermal undercooling (G/R ratio) for pure aluminum and aluminum containing 0.10 wt. pct. titanium or zirconium tested under a four percent augmented strain.

The fundamental fact upon which the manufacturing process to be described is based is the discovery that the behavior of the titanium or zirconium additions in the weld pool is dependent on the form, that is the intermetallic phase, and the distribution and morphology of the intermetallic phase, prior to the welding process. This is contrary to the conventional wisdom that the form of the addition (whether solid solution or intermetallic) does not influence the ability of the addition to nucleate new grains. The form, distribution and morphology of the intermetallic compound are a function of the manufacturing used to produce the welding consumable, as will be shown, and accordingly are of vital importance to the ultimate success of the grain refinement for enhancement of the weldability.

Because the intermetallic particles have been found to be susceptible to dissolution in the weld pool under the encountered thermodynamic conditions, which impacts the final outcome of both grain size and vulnerability to hot tearing in the weld, the size of the intermetallic particles becomes important because dissolution susceptibility is a primary function of particle size and distribution. Therefore, since intermetallic particle size and distribution is of the utmost importance, a manufacturing process will be described which will allow for the enhancement and control of the size and distribution of the intermetallic particles during the formation of the welding consumable.

The first sequence of events involved in the described processing sequence involves the addition of the master alloy to the melt from which ingots will be cast for the eventual formation of the welding consumables. The master alloy is comprised of a binary alloy between aluminum and six weight percent titanium or aluminum and six weight percent zirconium. To the melt which contains the aluminum alloy from which the welding consumable will be formed are added solid chunks of the master alloy. The amount of master alloy to be added should be in the amount such that the final weldment produced should contain a concentration of 0.30 weight percent of titanium or 0.20 weight percent of zirconium. This concentration in the weldment was found to produce the best combination of weldability and weld metal mechanical properties.

FIGS. 1 and 2 are photomicrographs of the intermetallic particles for the titanium and zirconium intermetallic phase respectively as they exist in the master alloy material prior to being added to the aluminum alloy melt from which the welding consumable will be manufactured. From FIGS. 1 and 2, it is seen that the intermetallic particles exist in the form of elongated flakes, as opposed to petal- or block-type forms which can also occur for the system. Also notable is the distribution and large size of the particles as they exist in the master alloy material, indicating a slow rate of cooling of the master alloy ingot. The particles are large in size and thus small in number and are also seen to be exemplary in form, lacking significant fractures or separations.

When the solid chunks of the master alloy are added to the aluminum melt, the master alloy pieces experience a larger thermal shock. This results in fracturing of the brittle crystals of the $TiAl_3$ and $ZrAl_3$ intermetallic phase. The fracture mechanism involving thermal shock refines the size of the intermetallic crystals. This is further assisted by the dissolution of the interfaces between the fractured crystals as they are surrounded by the melt. Dissolution of the interfaces fosters further separation of the fractured intermetallic particles in the melt. FIG. 3 illustrates the fractured appearance of the intermetallic particles as they exist in the ingot after casting of the aluminum melt. Generally, the fracturing of the particles results in some particles not having physical separation of the interfaces while others are shown to have separated from the original crystal, as evident by the lighter colored aluminum matrix phase existing between the fractured zones. Both of these cases can be seen in FIG. 3, where they are highlighted by the arrows. FIG. 4 is a higher magnification photomicrograph of one of the particles that is partially fractured with several pieces beginning to separate from the original crystal.

The thermal fracturing and interface dissolution which occurs in this first processing step is extremely important since it allows the rather larger crystals which exist in the master alloy to be reduced in size and thus their numbers increased. This occurrence is important to grain refinement where a higher number of small particles is more favorable for achieving a finer grain size as opposed to having a small number of larger particles. In addition to the above-described processing step, several collateral procedures should be followed during this processing sequence and are thus part of the overall inventive process. The first area is that the time allowed to elapse between when the master alloy addition is made to the aluminum melt and the casting of the melt must be kept to a minimum. In addition, the cast ingot should be cooled to room temperature in as fast a manner as possible without causing defects within the ingot. Both of these are specific recommendations which address limiting the dissolution of the intermetallic particles prior to the next processing step which describes how to manufacture the welding consumable from the cast ingot.

After cooling, the ingot is cold-rolled and then drawn through a series of reductions with intermediate anneals as necessary. The results of the initial cold-rolling are shown in FIG. 5 which illustrates that the intermetallic phase is even more divided and broken into smaller sized particles as compared to former stages. Therefore, the intermetallic is susceptible to mechanical deformation which also enhances the distribution and size reduction of the particles. The annealing stages which may be used to enhance the ability to further deform the product will only effect the intermetallic particles by subjecting them to further dissolution. The number of intermediate anneals should be kept to a minimum so that the particles do not experience a significant amount of dissolution. In addition, when the ingot is rolled down into a rod form prior to the wire drawing process, the amount of reduction stages the ingot is exposed to need to be kept to a minimum. As an example, if the ingot can be rolled down to the final size before wire drawing in five stages as opposed to ten, then the lower number of stages should be employed so that the particle size is not reduced too much since small particles are desirable, but if they are too small, then they are susceptible to dissolution and thus will not provide grain refinement in the weld. In addition, the same limitations apply to the wire drawing operation.

Conformation of the validity of the process described can be found through examination of FIGS. 6 and 7. These figures show the actual weld test results for a welding consumable produced without the mechanical working step and for a welding consumable which received the mechanical working step used for the formation of a welding wire. The data show that for the welding consumable which just experienced the casting thermal shock and distribution treatment (labeled Tig) provided a smaller grain refining response as noted by a larger mean grain diameter. This is compared to a welding consumable which contained the additional mechanical working stages described for the formation of the welding wire consumable. These are for the metal-inert-gas welding process labeled under the three transfer modes of short circuit, globular, and spray. The three transfer modes under which the welding wire was tested showed better refinement (smaller grain size) than the tungsten-inert-gas process (Tig) performed on the consumable not having the mechanical working stage. This is proof that the mechanical working stage enhances the distribution of the intermetallic particles which aids the grain refinement and thus the weldability.

Figure 8:
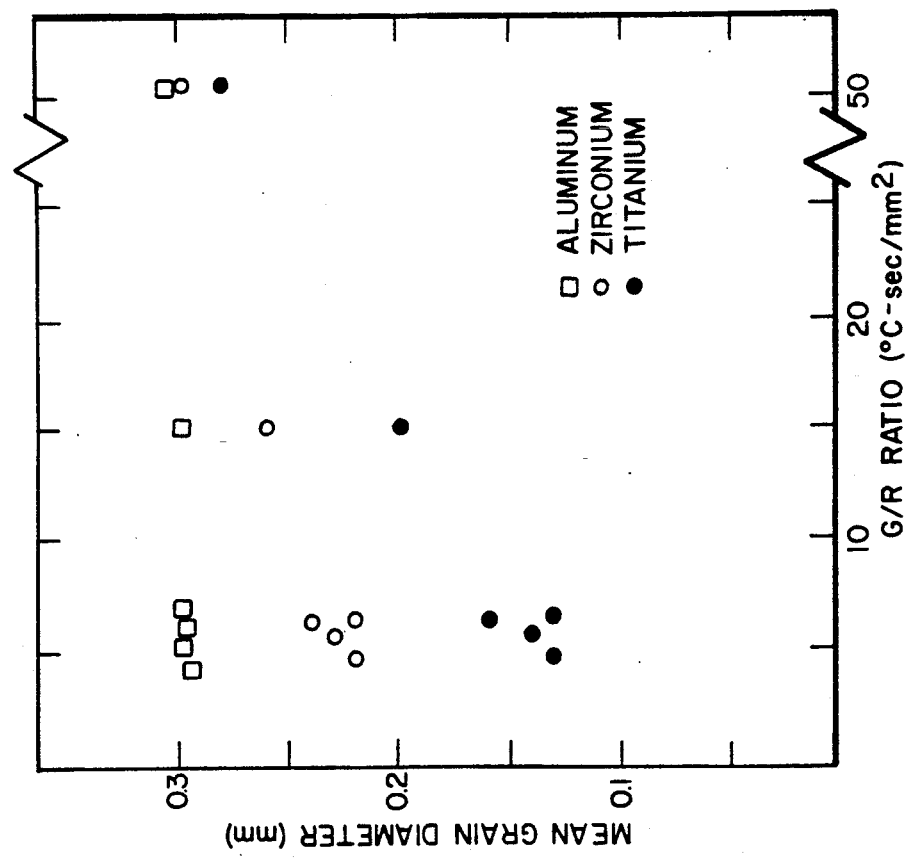
FIG. 8 shows mean grain diameter as a function of the thermal undercooling (G/R ratio) for pure aluminum and aluminum containing 0.10 wt. pct. titanium or zirconium.

The final element of the processing sequence to optimize the grain refinement for the welding consumable containing the intermetallic addition describes the conditions under which these consumables should be welded. The particles have been shown to be sensitive to dissolution in the weld pool, and therefore, the welding consumable should be welded under the following conditions. The weld parameters which are chosen should use higher high-heat inputs and welding speeds. As far as the selection of specific parameters, the weld parameters should be evaluated for the ratio of the thermal gradient measured at the centerline of the weld divided by the welding velocity. This ratio should be equal to or less than 15 deg. C-sec/mm$^2$ for the optimal grain refining response, but if this is not possible, then the selected weld parameters used out of the available weld parameters applicable to each case should have the minimum ratio. This analysis and recommendation is confirmed in FIGS. 8 and 9 which show that for welds containing a constant concentration of the grain refining additive, lower G/R ratios provided better grain refinement (noted by a decrease in mean grain diameter) and superior weldability (noted by a decrease in the total crack length of the hot tear defect).

We claim:

1. A process for manufacturing an aluminum welding consumable comprising the steps of:

creating an aluminum melt;

adding to the aluminum melt solid pieces of a master alloy, comprising aluminum and a weld-enhancing additive to form a mixture, wherein said weld-enhancing additive being a material selected from the group consisting of titanium and zirconium, so that the weld-enhancing additive exists in the alloy prior to addition to the melt in the form of intermetallic particles relatively large in size and small in number, and after addition to the melt the weld-enhancing additive exists in the form of fractured intermetallic particles of refined size having dissolved fractured interfaces, casting the mixture into a chill mold to form an ingot;

reducing the ingot to rods of rough wire dimension by cold rolling;

annealing the reduced rods; and drawing the rods into wire.

2. The process of claim 1 where the weld-enhancing additive is zirconium.

3. The process of claim 1 where the weld-enhancing additive is titanium.

4. The process of claim 2 where the zirconium is contained in a concentration amount in the welding consumable which yields 0.20 weight percent in the produced weld.

5. The process of claim 3 where the titanium is contained in a concentration amount in the welding consumable which yields 0.30 weight percent in the produced weld.

6. A process for optimizing the grain refining response of intermetallic additives in aluminum welding consumables comprising the steps of:

creating intermetallic particles of flake morphology in a master alloy solid, to form an intermetallic additive, said intermetallic additive consisting of one of a group of $TiAl_3$ and $ZrAl_3$, said intermetallic particles being in the form of elongated flakes of relatively large size to form a relatively small in number distribution, adding the master alloy solid to an aluminum melt and thereby thermally shocking the particles to produce fractured flake intermetallic crystals;

dissolving the fracture interfaces of the intermetallic crystals to increase distribution of this phase;

casting the resultant melt in a chill mold to produce an ingot; and mechanically working the ingot into a consumable wire form to further fracture and distribute the intermetallic particles.

7. The process of claim 6 where the intermetallic additive is $TiAl_3$.

8. The process of claim 6 where the intermetallic additive is $ZrAl_3$.

9. The process of claim 6 where the intermetallic additive is contained in a concentration which will yield a final concentration in the produced weldment of 0.20 weight percent zirconium or 0.30 weight percent titanium.

* * * * *